United States Patent
Hariram et al.

(10) Patent No.: US 12,522,354 B2
(45) Date of Patent: Jan. 13, 2026

(54) AUGMENTED HOIST CABLE CUT ALGORITHM

(71) Applicant: Hornet AcquisitionCo, LLC, Vancouver, WA (US)

(72) Inventors: Sridhar Hariram, Bangalore (IN); Rajagopal Kalathur Srinivasan, Chandler, AZ (US); Greeshma Nellikkurussi Kalarikkal, Kerala (IN); Manju Maheve, Bangalore (IN)

(73) Assignee: HORNET ACQUISITIONCO, LLC, Vancouver, WA (US)

( * ) Notice: Subject to any disclaimer, the term of this patent is extended or adjusted under 35 U.S.C. 154(b) by 772 days.

(21) Appl. No.: 17/864,271

(22) Filed: Jul. 13, 2022

(65) Prior Publication Data

US 2023/0348058 A1 Nov. 2, 2023

(30) Foreign Application Priority Data

Apr. 28, 2022 (IN) .............................. 202241025009

(51) Int. Cl.
*B64D 1/02* (2006.01)
*B66D 1/58* (2006.01)

(52) U.S. Cl.
CPC ................ *B64D 1/02* (2013.01); *B66D 1/58* (2013.01)

(58) Field of Classification Search
CPC .............. B64D 1/02; B66D 1/58; B66D 1/16
See application file for complete search history.

(56) References Cited

U.S. PATENT DOCUMENTS

| 9,850,103 B2 * | 12/2017 | Lopes ........................ G01L 5/04 |
| 10,384,782 B2 | 8/2019 | Curran et al. |
| 10,519,013 B2 | 12/2019 | Curran et al. |
| 10,571,365 B2 * | 2/2020 | Bryson .................. B66D 1/485 |
| 10,654,695 B1 * | 5/2020 | Lopes ........................ B66D 1/54 |
| 10,906,783 B2 * | 2/2021 | Roedts, II .............. G05D 1/101 |
| 11,993,493 B2 * | 5/2024 | Topp ........................ B66C 15/00 |
| 2022/0315397 A1 * | 10/2022 | Azeredo .................. B66D 1/48 |

FOREIGN PATENT DOCUMENTS

| CN | 110740964 A * | 1/2020 | ........... B64C 39/024 |
| EP | 3070045 A1 * | 9/2016 | .............. B66D 1/12 |
| EP | 3 070 045 | 8/2021 | |

OTHER PUBLICATIONS

European Patent Office, European Search Report dated Oct. 4, 2023 in Application No. 23170804.1.

* cited by examiner

*Primary Examiner* — Patrick H Mackey
(74) *Attorney, Agent, or Firm* — SNELL & WILMER L.L.P.

(57) ABSTRACT

Systems and methods for operating a hoist and hook assembly may method comprising determining a clutch slip via a clutch sensor, determining an overload via a load sensor, and cutting a cable coupled to the hoist and hook assembly in response to the clutch slip determination and the overload determination.

25 Claims, 5 Drawing Sheets

AUGMENTED HOIST CABLE CUT ALGORITHM

CROSS-REFERENCE TO RELATED APPLICATIONS

This application claims priority to, and the benefit of, India Patent Application No. 202241025009, filed Apr. 28, 2022, (DAS Code BA80) and titled "AUGMENTED HOIST CABLE CUT ALGORITHM," which is incorporated by reference herein in its entirety for all purposes.

FIELD

The disclosure relates generally to cable hoists, and more particularly to rescue hoist cable cut alert systems and methods.

BACKGROUND

Hoist and winches are commonly used on aircrafts and ships to haul, pull, raise, and lower heavy loads. Hoists may be used to apply pulling force through a cable or other lifting medium to a load. Hoists and hooks are used in various vertical applications including, for example, cranes and aircraft mounted rescue hoists. During the course of rescue operations using an aircraft rescue hoist, the supported load on the rescue hoist cable is imparted to the aircraft via the rescue hoist and supporting structure. Often times, the support load will be one or two persons. The hoists have safe operating capacities, and exceeding the safe capacity may result in dangerous conditions. A hoist cable encountering an overload condition beyond the rated capacity might lead to a cable snapping, resulting in a hazardous scenario for a helicopter. A pilot or operator may have limited reaction time. Accordingly, the manual decision to initiate the cable-cut activity among multiple emergency situations is not ideal.

SUMMARY

A method of operating a hoist and hook assembly is also provided. The method may include determining a clutch slip via a clutch sensor, determining an overload via a load sensor, and cutting a cable coupled to the hoist and hook assembly.

In various embodiments, the method includes determining a first clutch slip via a first clutch sensor on a motor side of a gear train of the hoist and hook assembly and determining a second clutch slip via a second clutch sensor on a drum side of the gear train of the hoist and hook assembly.

In various embodiments, the method includes determining a duration of the clutch slip is at or above a first predefined threshold and determining a duration of the sensed overload is at or above a second predefined threshold.

In various embodiments, the method includes initiating a cable cut in response to determining the clutch slip and the overload, indicating aurally and visually that a third predefined threshold has elapsed, and cutting the cable in response to the third predefined threshold elapsing and a cable cut switch not being set to disable.

A non-transitory, tangible computer readable storage medium having instructions stored thereon that, in response to execution by a processor, cause the processor to perform operations is also provided. The operations comprise determining, by the processor, a clutch slip using a clutch sensor, determining, by the processor, an overload using a load sensor, and cutting, by a processor, a cable coupled to the hoist and hook assembly using a cable cut cartridge.

In various embodiments, the operations include determining a first clutch slip via a first clutch sensor on a motor side of a gear train of the hoist and hook assembly and determining a second clutch slip via a second clutch sensor on a drum side of the gear train of the hoist and hook assembly.

In various embodiments, the operations include determining a duration of the clutch slip is at or above a first predefined threshold and determining a duration of the sensed overload is at or above a second predefined threshold.

In various embodiments, the operations include initiating a cable cut in response to determining the clutch slip and the overload, indicating aurally and visually that a third predefined threshold has elapsed, and cutting the cable in response to the third predefined threshold elapsing and a cable cut switch not being set to disable.

A hoist system is also provided. The hoist system comprises an airframe mechanically coupled to a hoist assembly, a cable disposed between the hoist assembly and a hook assembly, at least one clutch sensor, at least one load sensor, a cable cut cartridge, and a controller. The controller is configured to determine a clutch slip via the clutch sensor, determine an overload via the load sensor, and cut the cable via the cable cut cartridge.

In various embodiments, the controller is further configured to determine a first clutch slip via a first clutch sensor on a motor side of a gear train of the hoist and hook assembly and a second clutch slip via a second clutch sensor on a drum side of the gear train of the hoist and hook assembly.

In various embodiments, the controller is further configured to determine a duration of the clutch slip is at or above a first predefined threshold and a duration of the sensed overload is at or above a second predefined threshold.

In various embodiments, the controller is further configured to initiate a cable cut in response to determining the clutch slip and the overload, indicate aurally and visually that a third predefined threshold has elapsed, and cut the cable in response to the third predefined threshold elapsing and a cable cut switch not being set to disable.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

Figure 1:
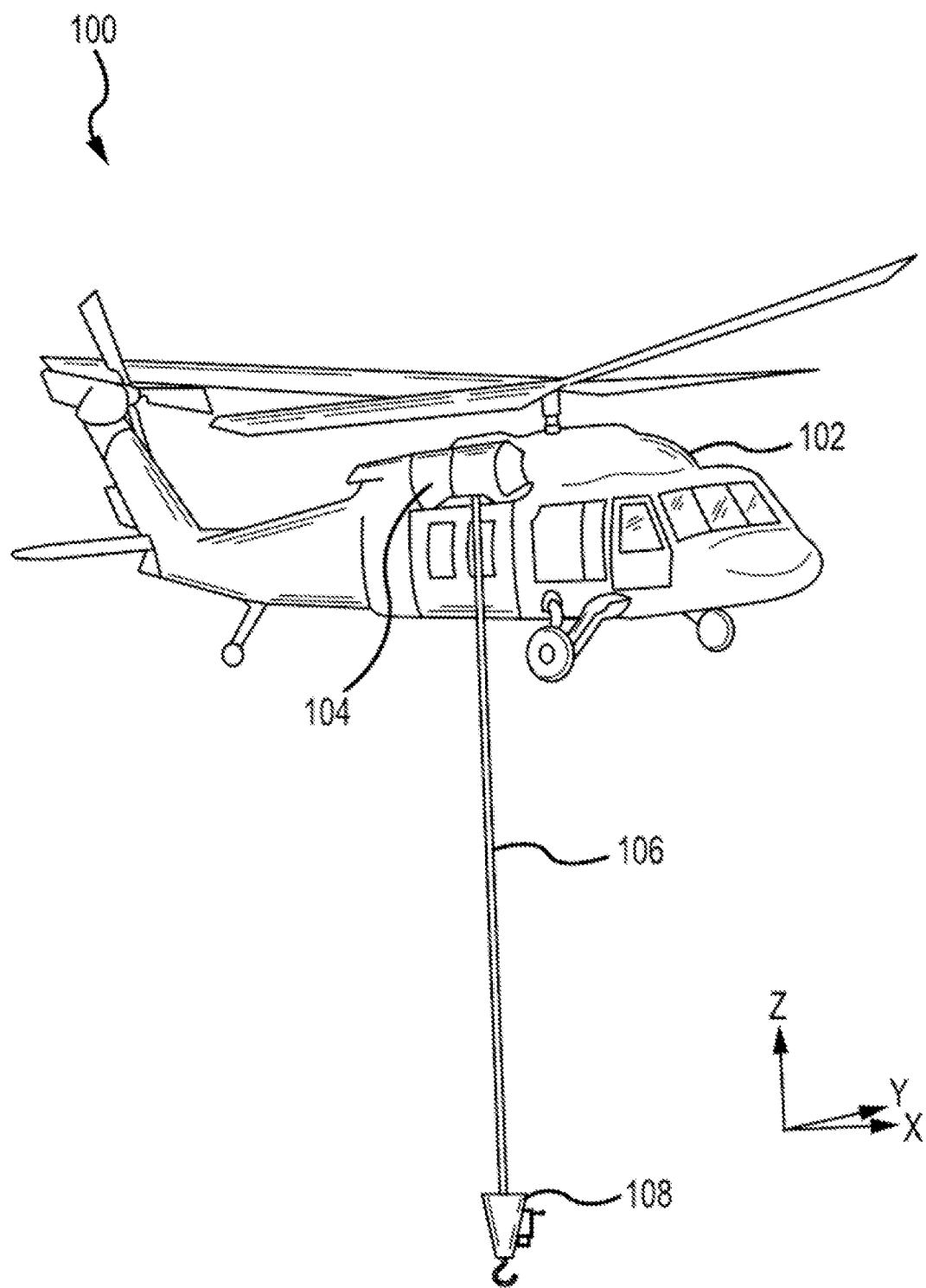
FIG. 1 illustrates an exemplary hoist assembly and hook assembly mechanically coupled to an aircraft for positioning the hoist assembly and/or hook assembly, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, electronic, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

A cable cut system in a rescue hoist assembly is vital to abandon the attached load in the event of cable snag, which would ideally happen automatically without the need for manual cutting of the cable. The failure of cable cutting in the event of snagging on ground objects can cause structural damage because of cable snapping and recoiling into the helicopter rotors blades. Though a handheld cutting tool is made available, the damage would have been complete by the time human intervention is possible during such a scenario. Accidents may be caused due to the delay of human intervention in initiating (i.e., arming+firing) the cable cut system as the pilot was engaged in stabilizing the helicopter before reacting to initiate the cable cut which could have been avoided if the cable cut circuitry was fired automatically without the need of human intervention.

Accordingly, a Rescue Hoist System (RHS) with an augmented cable cutting algorithm is provided. The RHS includes a hoist and auxiliary components (e.g., control devices), and provides the capability to hoist Human External Cargo (HEC) and Non-Human External Cargo (NHEC) up and down from the RHS-equipped helicopter. The RHS with an augmented cable cutting algorithm, in various embodiments, monitors continuously dual-redundant clutch-slip and load monitors and executes the decision to perform cable cut with a pre-determined time window for aural and visual indication and option for operator/pilot to override during this time.

The cable cut decision is taken, in various embodiments, based on overload detection by clutch slip assembly and load pin. The current cable cut circuitry functions based, in various embodiments, on two cable cut switches when activated will power the ARMED and TRIGGER relays to send power to the cable cut cartridge. In various operational procedures, either or both the switches (Operator & Pilot) need to be activated manually to initiate cable cutting operation. In the augmented system described herein, the arming of the cable cut when a snag is detected and firing will be performed based on a preset timer with an override option based on pilot's input. The override option, in various embodiments, is available in cockpit/operator panel to the pilot/operator for approving or rejecting the cable cut operation prioritizing the loss of HEC/NHEC and/or Helicopter.

The RHS with an augmented cable cutting algorithm avoids delay caused by human intervention in the activation of cable cut circuitry during a snagging scenario, thus can reduce the risk of crashing the helicopter as the cable cut will be completed within a pre-determined time of snagging, saving precious time while allowing operator/pilot option to decide on override.

Referring now to FIG. 1, an exemplary hoist and hook system 100 is shown, in accordance with various embodiments. Hoist and hook system 100 includes an airframe 102 mechanically coupled to a hoist assembly 104. Hoist assembly 104 may be coupled directly to airframe 102 or mechanically coupled to a boom that is mechanically coupled to airframe 102. Cable 106 may be wound about a drum within hoist assembly 104 and released or retracted based on rotation of the drum. Cable 106 may thus hang at various distances from hoist assembly 104 and airframe 102. A hook assembly 108 may be coupled to cable 106 at the free end of the cable opposite hoist assembly 104. Hook assembly 108 may hang from hoist assembly 104 on cable 106. Cable 106 and hoist assembly 104 may thus swing and/or translate relative to hoist assembly 104 and airframe 102. The position of hoist assembly 104 may be controlled in part by changing the position of hoist assembly 104 and/or airframe 102.

Figure 2:
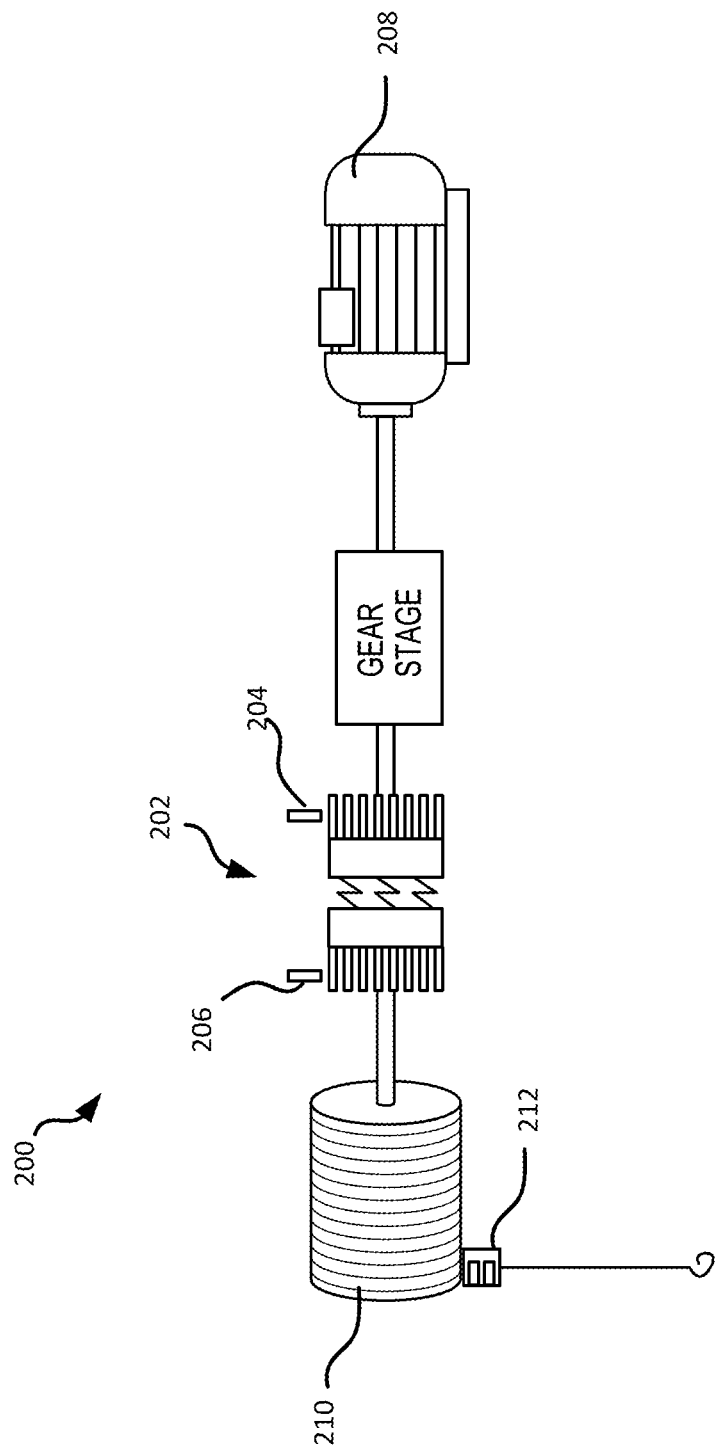
FIG. 2 illustrates a sensor assembly having a sensor configured to detect a clutch slip and an overload, in accordance with various embodiments.

Referring now to FIG. 2, a sensor assembly 200 is illustrated, in accordance with various embodiments. The sensor assembly 200 includes an overload slip clutch assembly 202. The overload slip cutch assembly 202 is configured to reside in the gear train, and to actuate and release cable load tension on the cable when the tension reaches a threshold due to overload. During excessive loads due to snagging, cable cut action would be required to avoid damage to the helicopter. The clutch slip is configured to be activated under extreme load conditions such as when the hook or hoist payload is caught or tangled with a ground object (e.g., a tree), for instance, the cable has wrapped around another item such that the payload is no longer free-moving, and cannot be released or overloaded more than the limit load (e.g., 3.5 times of rated load), and the clutch slip assembly 202 detects "slip". For instance, movement detected by a first slip sensor assembly (e.g., motor side rotation of a gear train) with no corresponding movement (e.g., no movement or minimal movement) from a second slip sensor assembly (e.g., drum side rotation of the gear train) is considered a clutch slip.

Each side of the overload clutch slip assembly 202 includes a slip sensor. For instance, a first slip sensor 204 is positioned on a motor side of the overload slip clutch assembly 202 and a second slip sensor 206 is positioned on a cable drum side of the overload slip clutch assembly 202. The motor side of the overload slip clutch assembly 202 refers to the side including a motor 208 of the gear train and the cable drum side of the overload slip clutch assembly 202 refers to the side including a cable drum 210 of the gear train. The motor side and cable drum side slip sensors (e.g., the first and second slip sensors 204, 206) are independently monitored by CON (Control) and MON (Monitor) lanes of a controller to determine if clutch slip has occurred. For instance, the decision that a clutch slip has occurred is made when both CON and MON lanes independently determine that a clutch slip occurred. Clutch slip persisting for at least T1 seconds (e.g., 2 seconds) is only reported to prevent single slip events or short duration slips from activating the cable cutting operation. For instance, T1 is the time elapsed once movement is detected by the first slip sensor 204 but no corresponding movement (or minimal movement) from the second slip sensor 206 is detected. The first and second slip sensors 204, 206 detect the movement discrepancy and send a message via the controller. As described herein, the controller then used the message to determine whether to initiate the cable cut. The sensor assembly 200 is configurable to determine the decision-making process with a combination of time and load factor.

In addition to clutch slip monitoring, hoist load via a load sensor 212 also may be monitored independently by CON (Control) and MON (Monitor) lanes of the hoist controller unit to determine an overload condition if the threshold is crossed for a persistence time of T2 seconds (e.g., 2 seconds). For instance, when the cable is snagged, the load sensor 212 may detect an overload condition due to the excess force being applied to the hoist assembly 104. Accordingly, as the overload condition persists for a certain period of time (e.g., T2), the sensor assembly 200 is configured to detect a snag, entanglement of the cable 106, etc.

In various embodiments, a communication device may be in electronic communication with the first and second clutch sensors 204, 206. Communication device may be, for example, a wireless transceiver. Communication device may be configured to transmit and/or receive data to and/or from hook assembly 108. In that regard, communication device may transmit data captured by the first and second clutch sensors 204, 206. Communication device may be in electromagnetic communication with a similar communication device on airframe 102 and/or hoist assembly 104. In various embodiments, cable 106 may also be configured to carry electrical power and/or electrical signals between hook assembly 108 and hoist assembly 104.

Figure 3:
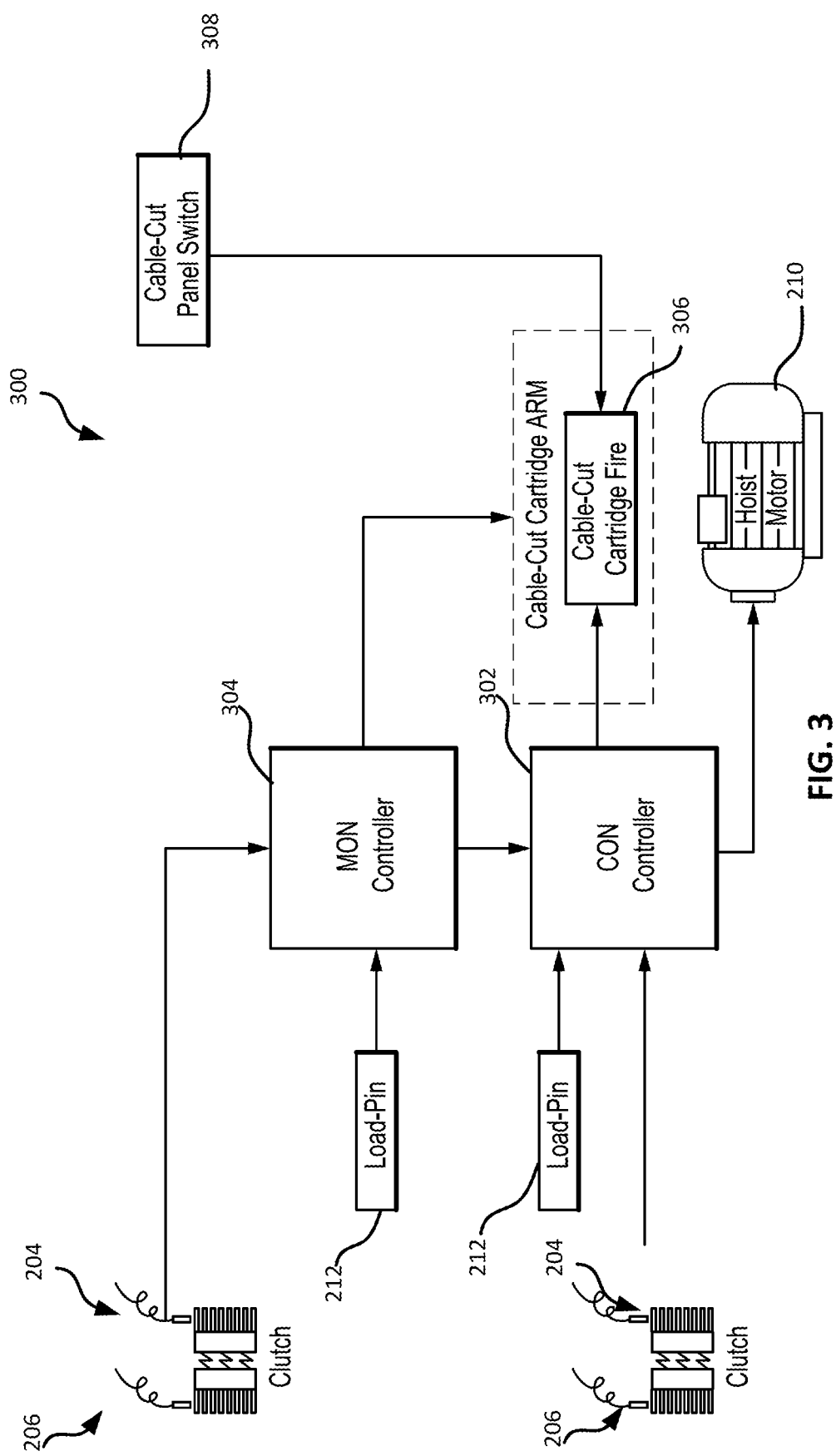
FIG. 3 illustrates an exemplary sensor monitoring and cable cut cartridge control system, in accordance with various embodiments.

With reference to FIG. 3, an exemplary sensor monitoring and cable cut cartridge control system 300 (the "cable cut system 300") is illustrated, in accordance with various embodiments. In the cable cut system 300, the CON/MON lanes are independent for sensor monitoring. For instance, the cable cut system 300 includes a CON controller 302 and a MON controller 304. If both clutch slip sensors 204, 206 and load sensor 212 indicates excessive load, possibly due to snagging, a cable cut cartridge 306 is automatically armed (powered) by the MON controller 304. However, the firing action is controlled by CON controller 302 in response to the hoist operator approving the cable cut request through cable cut panel switch 308. For instance, the cable cut is initiated in response to determining the clutch slip and the overload. An aural and visual indication is triggered, indicating that a predefined threshold has elapsed. The cable is then cut in response to the third predefined threshold elapsing if the cable cut switch is not set to disable.

Figure 4:
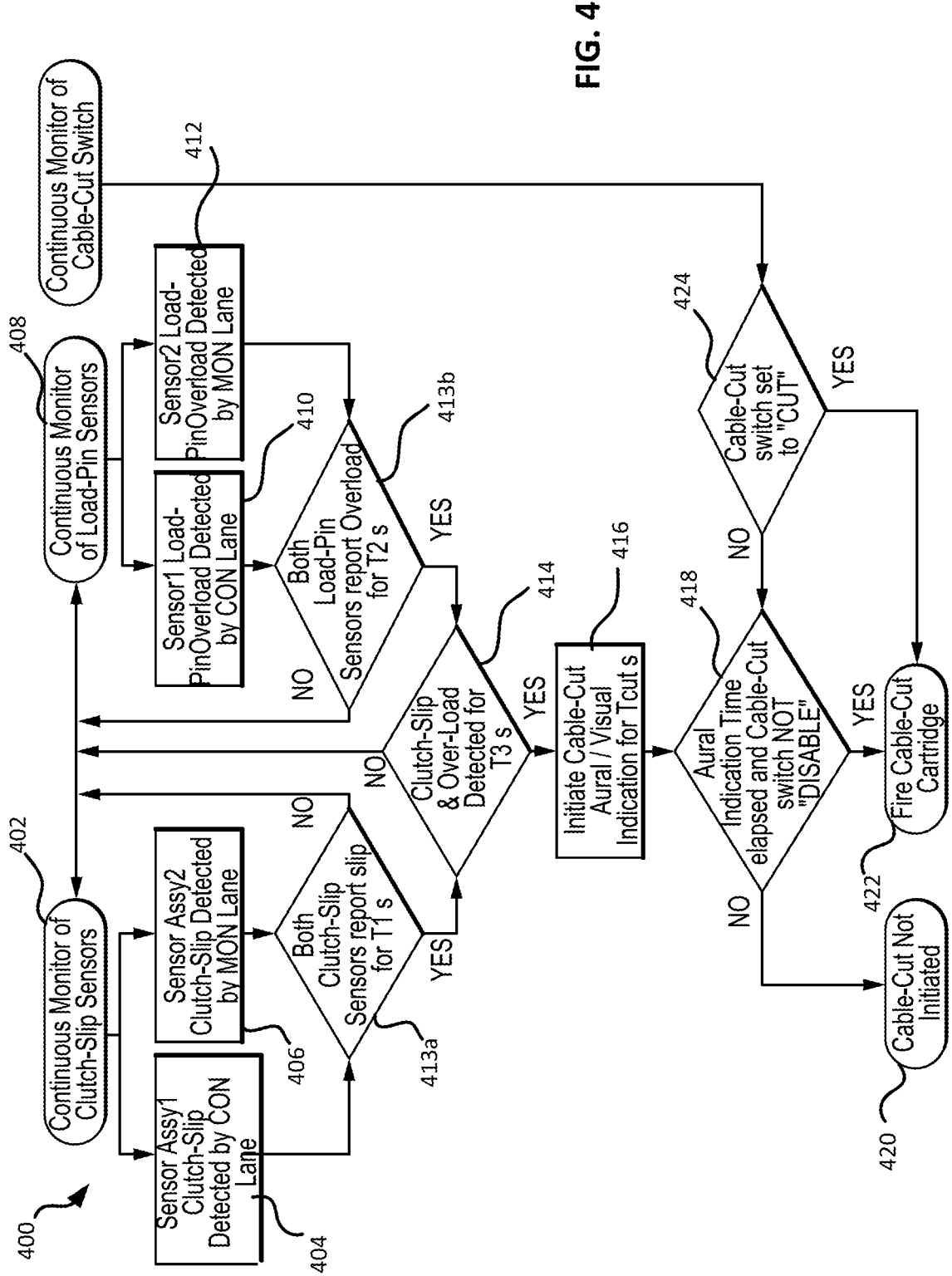
FIG. 4 illustrates an exemplary method logic of operating the sensor monitoring and cable cut cartridge control system of FIG. 3, in accordance with various embodiments.

Referring now to FIG. 4, a method 400 of operating the sensor monitoring and cable cut cartridge control system 300 is illustrated. If the two independent slip sensors indicate clutch slip and load sensor indicates an overload condition for T3 seconds (e.g., 2 seconds), the mitigating action is activated automatically by arming the cable cut circuitry (e.g., enabling the cable cut cartridge 306 with necessary power inputs, but not activating the cable cut operation) and displaying an aural and visual indication for a specified duration $T_{CUT}$ seconds (e.g., 4 seconds). This indication is a request for the hoist operator or the pilot to authorize cutting of the cable. The hoist operator or the pilot is provided with the cable cut panel switch 308 with position "CUT", "DISABLE" and "NULL" to approve/reject the cable cutting. "CUT" position activates cable cutting the moment it is pressed while "DISABLE" causes rejection of cable cutting. If "NULL" is received from the cable cut panel switch 308 then the cable is cut automatically once the aural and visual indication is elapsed, i.e., after $T_{CUT}$ seconds. In response to the cable cut switch being "DISABLE", the algorithm ceases authority for automatic cable cut until the next power cycle. However, the cable cut panel switch 308 will still have authority to fire the cable-cut cartridge.

For instance, at 402, continuous monitoring of the clutch slip sensors 204, 206 occurs. At 404 and 406, the CON controller 302 and the MON controller 304 detect whether a clutch slip is detected via the first clutch sensor 204 and the second clutch sensor 206, respectively. Contemporaneously, at 408, continuous monitoring of the load sensors 212 occurs. At 410 and 412, the CON controller 302 and the MON controller 304 detect whether an overload is detected via the load sensor 212, respectively. At 414, the cable cut system 300 determines if clutch slip has occurred for T1 (e.g., YES at 413*a*) and if overload has occurred for T2 (e.g., YES at 413*b*). If YES, at 416, the cable cut system 300 initiates the cable cut aural or visual indication for $T_{CUT}$ seconds. At 418, the aural or visual indication time elapses and determines whether the cable cut panel switch 308 is not set to DISABLE status. If NO, the cable cut is not initiated at 420. If YES, the system triggers the cable cut cartridge at 422. Further, at 424, if the cable cut switch is set to CUT, the system triggers the cable cut cartridge at 422.

T1, T2, T3 and $T_{CUT}$ may be times that are configuration and specific to a configuration and length of specific host. Overload and clutch slip parameters are additionally configuration based on the hoist configuration.

The cable cut system and method may be operated by and executed on a controller. A controller may be, for example, a computer based-system having a processor and memory. A controller may thus include one or more processors and one or more tangible, non-transitory memories and be capable of implementing logic. The processor can be a general purpose processor, a digital signal processor (DSP), an application specific integrated circuit (ASIC), a field programmable gate array (FPGA), a graphical processing unit (GPU), or other programmable logic device, discrete gate or transistor logic, discrete hardware components, or any combination thereof.

In various embodiments, the processor may thus be configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the controller may be in electronic communication with the first and second clutch sensors 204, 206. The controller may, for example, receive a signal from the first and second clutch sensors 104, 106. The controller may be in electronic communication via, for example, one or more of a wire, a bus, a circuit, a wireless channel, or another suitable electronic communication channel. The controller may transmit control signals to airframe 102, hoist assembly 104, and/or hook assembly 108 of FIG. 1.

Figure 5:
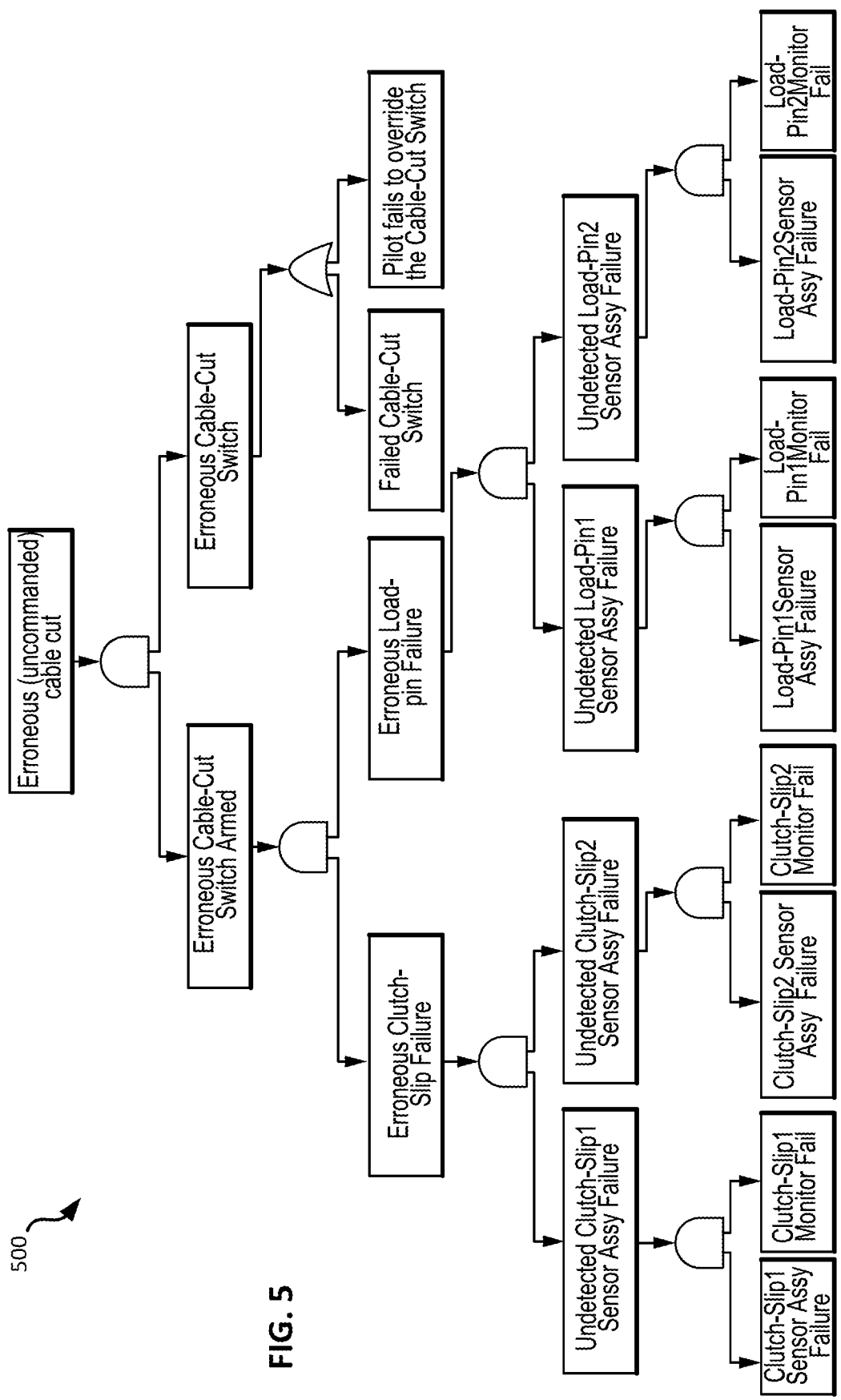
FIG. 5 illustrates an exemplary fault prevention logic, in accordance with various embodiments.

Referring to FIG. 5, a fault prevention logic 500 is illustrated. The erroneous or inadvertent (uncommanded) cable cutting action occurring with the HEC attached to the hoist could result in loss of HEC which is catastrophic. This scenario is overcome by a combination of Dual Modular Redundant (DMR) architecture with pair of dissimilar sensors and continuous monitoring. The probability of occurrence of both dual sensor network being erroneous to automatically arm and failure of pilot override to disable would be extremely low for an inadvertent cable cutting action to occur. For instance, for an erroneous cable cut to occur, both of the clutch slip sensors, the load sensor, and the controller/monitoring systems would have to fail. Within that scenario, any of the failed components would have to go undetected, the cable cut would erroneously be armed, and the pilot would further have to fail to override the cable cut switch (or the cable cut switch would have to fail). Accordingly, the augmented hoist cable cut algorithm described herein ensures a low probability of automatic erroneous cable cut.

Systems and methods of the augmented cable cutting increases the operational safety and protection from cable and helicopter damage when the hoist load or hook is snagged to a ground object and cannot be unsnagged. A cable cutting cartridge will be armed automatically when the overload is detected by load sensors and clutch slip is detected by slip sensors indicating a snag condition. At the same time, hoist operator or pilot will be provided with an aural and visual indication of cable cut arming for a pre-determined duration. The hoist operator or pilot will provide input through the 3-way cable cut switch to authorize (reject/approve) the cable cut operation based on the scenario. No input, ie. "NULL" position will initiate automatic cable cutting at the end of aural/visual indication. The augmented cable cutting system avoids delay caused by human intervention in the activation of cable cut circuitry during a snagging scenario and reduce the risk of crashing of helicopter as the cable cut will be completed within a pre-determined time of snagging, thus saving time.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of operating a hoist and hook assembly, comprising:
   determining, by a controller, a clutch slip via a clutch sensor;
   determining, by the controller, an overload via a load sensor;
   determining a duration of at least one of the clutch slip or the sensed overload is at or above a first predefined threshold; and
   cutting, by the controller, a cable coupled to the hoist and hook assembly in response to the clutch slip determination and the overload determination.

2. The method of claim 1, further comprising determining, by the controller, a first clutch slip via a first clutch sensor on a motor side of a gear train of the hoist and hook assembly.

3. The method of claim 2, further comprising determining, by the controller, a second clutch slip via a second clutch sensor on a drum side of the gear train of the hoist and hook assembly.

4. The method of claim 1, further comprising initiating a cable cut in response to determining the clutch slip and the overload.

5. The method of claim 1, further comprising indicating aurally or visually that a second predefined threshold has elapsed.

6. The method of claim 5, further comprising cutting the cable in response to the third predefined threshold elapsing and a cable cut switch not being set to disable.

7. A non-transitory, tangible computer readable storage medium having instructions stored thereon that, in response to execution by a processor, cause the processor to perform operations comprising:
   determining, by the processor, a clutch slip using a clutch sensor;

determining, by the processor, an overload using a load sensor;

determining a duration of at least one of the clutch slip or the sensed overload is at or above a first predefined threshold; and cutting, by the processor, a cable coupled to the hoist and hook assembly using a cable cut cartridge in response to the clutch slip determination and the overload determination.

8. The non-transitory, tangible computer readable storage medium of claim 7, wherein the operations further comprise determining, by the processor, a first clutch slip via a first clutch sensor on a motor side of a gear train of the hoist and hook assembly.

9. The non-transitory, tangible computer readable storage medium of claim 8, wherein the operations further comprise determining, by the processor, a second clutch slip via a second clutch sensor on a drum side of the gear train of the hoist and hook assembly.

10. The non-transitory, tangible computer readable storage medium of claim 7, wherein the operations further comprise initiating a cable cut in response to determining the clutch slip and the overload.

11. The non-transitory, tangible computer readable storage medium of claim 7, wherein the operations further comprise indicating aurally or visually that a second predefined threshold has elapsed.

12. The non-transitory, tangible computer readable storage medium of claim 11, wherein the operations further comprise cutting the cable in response to the third predefined threshold elapsing and a cable cut switch not being set to disable.

13. A hoist system comprising,
an airframe mechanically coupled to a hoist assembly;
a cable disposed between the hoist assembly and a hook assembly;
a clutch sensor coupled to the hoist assembly;
a load sensor coupled to the cable; and
a controller configured to:
determine a clutch slip via the clutch sensor;
determine an overload via the load sensor;
determine a duration of the clutch slip is at or above a first predefined threshold and a duration of the sensed overload is at or above a second predefined threshold; and
cut the cable via a cable cut cartridge in response to the clutch slip determination and the overload determination.

14. The hoist system of claim 13, wherein the controller is further configured to determine a first clutch slip via a first clutch sensor on a motor side of a gear train of the hoist and hook assembly and a second clutch slip via a second clutch sensor on a drum side of the gear train of the hoist assembly.

15. The hoist system of claim 13, wherein the controller is further configured to:
initiate a cable cut in response to determining the clutch slip and the overload;
indicate aurally or visually that a third predefined threshold has elapsed; and
cut the cable in response to the third predefined threshold elapsing and a cable cut switch not being set to disable.

16. A method of operating a hoist and hook assembly, comprising:
determining, by a controller, a first clutch slip via a first clutch sensor on a motor side of a gear train of the hoist and hook assembly;
determining, by the controller, an overload via a load sensor; and
cutting, by the controller, a cable coupled to the hoist and hook assembly in response to the clutch slip determination and the overload determination.

17. The method of claim 16, further comprising determining, by the controller, a second clutch slip via a second clutch sensor on a drum side of the gear train of the hoist and hook assembly.

18. A method of operating a hoist and hook assembly, comprising:
determining, by a controller, a clutch slip via a clutch sensor;
determining, by the controller, an overload via a load sensor;
initiating, by the controller, a cable cut in response to determining the clutch slip and the overload; and
cutting a cable coupled to the hoist and hook assembly in response to the clutch slip determination and the overload determination.

19. A method of operating a hoist and hook assembly, comprising:
determining, by a controller, a clutch slip via a clutch sensor;
determining, by the controller, an overload via a load sensor;
indicating aurally or visually that a predefined threshold has elapsed; and
cutting, by the controller, a cable coupled to the hoist and hook assembly in response to the clutch slip determination and the overload determination.

20. A non-transitory, tangible computer readable storage medium having instructions stored thereon that, in response to execution by a processor, cause the processor to perform operations comprising:
determining, by the processor, a first clutch slip via a first clutch sensor on a motor side of a gear train of the hoist and hook assembly;
determining, by the processor, an overload using a load sensor; and
cutting, by the processor, a cable coupled to the hoist and hook assembly using a cable cut cartridge in response to the clutch slip determination and the overload determination.

21. The non-transitory, tangible computer readable storage medium of claim 20, wherein the operations further comprise determining, by the processor, a second clutch slip via a second clutch sensor on a drum side of the gear train of the hoist and hook assembly.

22. A non-transitory, tangible computer readable storage medium having instructions stored thereon that, in response to execution by a processor, cause the processor to perform operations comprising:
determining, by the processor, a clutch slip using a clutch sensor;
determining, by the processor, an overload using a load sensor;
initiating, by the processor, a cable cut in response to determining the clutch slip and the overload; and
cutting a cable coupled to the hoist and hook assembly using a cable cut cartridge in response to the clutch slip determination and the overload determination.

23. A non-transitory, tangible computer readable storage medium having instructions stored thereon that, in response to execution by a processor, cause the processor to perform operations comprising:

determining, by the processor, a clutch slip using a clutch sensor;

determining, by the processor, an overload using a load sensor;

indicating aurally or visually that a predefined threshold has elapsed; and cutting, by the processor, a cable coupled to the hoist and hook assembly using a cable cut cartridge in response to the clutch slip determination and the overload determination.

24. A hoist system comprising, an airframe mechanically coupled to a hoist assembly;

a cable disposed between the hoist assembly and a hook assembly;

a clutch sensor coupled to the hoist assembly;

a load sensor coupled to the cable; and a controller configured to:

determine a first clutch slip via a first clutch sensor on a motor side of a gear train of the hoist and hook assembly;

determine a second clutch slip via a second clutch sensor on a drum side of the gear train of the hoist assembly;

determine an overload via the load sensor; and cut the cable via a cable cut cartridge in response to the clutch slip determination and the overload determination.

25. A hoist system comprising, an airframe mechanically coupled to a hoist assembly;

a cable disposed between the hoist assembly and a hook assembly;

a clutch sensor coupled to the hoist assembly;

a load sensor coupled to the cable; and a controller configured to:

determine a clutch slip via the clutch sensor;

determine an overload via the load sensor;

initiate a cable cut in response to determining the clutch slip and the overload;

indicate aurally or visually that a predefined threshold has elapsed; and at least one of cut the cable in response to the third predefined threshold elapsing and a cable cut switch not being set to disable or cut the cable via a cable cut cartridge in response to the clutch slip determination and the overload determination.

* * * * *